US011368405B2

(12) United States Patent
Martynov

(10) Patent No.: US 11,368,405 B2
(45) Date of Patent: Jun. 21, 2022

(54) STATISTICALLY-DRIVEN ADAPTIVE BANDWIDTH RESERVATION

(71) Applicant: Arista Networks, Inc., Santa Clara, CA (US)

(72) Inventor: Maxim Martynov, Santa Clara, CA (US)

(73) Assignee: ARISTA NETWORKS, INC., Santa Clara, CA (US)

(*) Notice: Subject to any disclaimer, the term of this patent is extended or adjusted under 35 U.S.C. 154(b) by 0 days.

(21) Appl. No.: 17/061,963

(22) Filed: Oct. 2, 2020

(65) Prior Publication Data

US 2022/0038386 A1 Feb. 3, 2022

Related U.S. Application Data

(60) Provisional application No. 63/058,754, filed on Jul. 30, 2020.

(51) Int. Cl.
*H04L 47/72* (2022.01)
*H04L 43/0894* (2022.01)
*H04L 41/0896* (2022.01)

(52) U.S. Cl.
CPC .......... *H04L 47/72* (2013.01); *H04L 41/0896* (2013.01); *H04L 43/0894* (2013.01)

(58) Field of Classification Search
CPC .. H04L 43/0894; H04L 47/72; H04L 41/0896
See application file for complete search history.

(56) References Cited

U.S. PATENT DOCUMENTS

| | | | |
|---|---|---|---|
| 8,798,088 B1* | 8/2014 | Shetty | H04W 72/1252 370/437 |
| 2003/0112766 A1* | 6/2003 | Riedel | H04L 47/767 370/252 |
| 2012/0144336 A1* | 6/2012 | Pinter | H04N 7/148 709/224 |
| 2013/0021928 A1* | 1/2013 | Weill | H04W 24/08 370/252 |
| 2018/0006962 A1* | 1/2018 | Barth | H04L 45/50 |
| 2018/0219796 A1* | 8/2018 | Fadle | H04L 47/801 |
| 2019/0394135 A1* | 12/2019 | Hisano | H04L 5/0094 |
| 2021/0092035 A1* | 3/2021 | Williams | H04L 47/822 |

* cited by examiner

*Primary Examiner* — Tonia L Dollinger
*Assistant Examiner* — Jihad K Boustany
(74) *Attorney, Agent, or Firm* — Fountainhead Law Group P.C.

(57) ABSTRACT

Data flow through a network device is periodically sampled. Lower and upper bandwidth reservation limits are periodically updated from the sampled data flow. A current setting of the bandwidth reservation for the flow path associated with the data flow is compared against the range bounded by the lower and upper bandwidth reservation limits. When the current bandwidth reservation falls outside of the range, bandwidth reservation of the flow path is adjusted.

20 Claims, 5 Drawing Sheets

STATISTICALLY-DRIVEN ADAPTIVE BANDWIDTH RESERVATION

CROSS REFERENCE TO RELATED APPLICATIONS

Pursuant to 35 U.S.C. § 119(e), this application is entitled to and claims the benefit of the filing date of U.S. Provisional App. No. 63/058,754 filed Jul. 30, 2020, the content of which is incorporated herein by reference in its entirety for all purposes.

BACKGROUND

Initially, the Internet protocol (IP) offered a best-effort service, where no delay or loss guarantees were provided. This service was adequate for applications that are not time-critical, or applications that are time-critical and operating under light load conditions. Under highly overloaded conditions, however, buffer overflows and queuing delays can cause the real-time communication quality to quickly degrade. With video streaming and conferencing applications, for example, traffic needs to be transmitted in continuous fashion (streamed) for an acceptable user experience. Streaming requires a guaranteed Quality of Service (QoS) in terms of ensuring minimum available bandwidth and/or maximum delay along the entire path of the traffic flow. Resource Reservation Protocol (RSVP) is a signaling protocol designed to provide a certain level of QoS by enabling receivers of traffic flows to reserve resources for the flow along the flow's path.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1A:
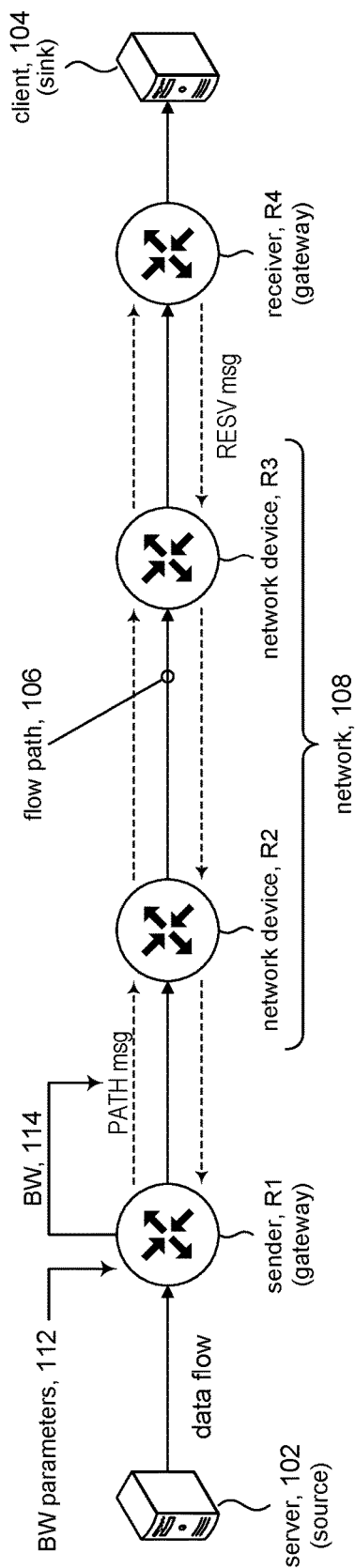
FIG. 1A shows a configuration in accordance with an embodiment of the present disclosure.

FIG. 1A shows a configuration for monitoring and adjusting bandwidth reservation in accordance with some embodiments of the present disclosure. Server 102 represents a data source and client 104 represents a data sink. For example, server 102 can be a video streaming service that streams video on demand to client 104. In a video conferencing use case, both server 102 and client 104 can take on the role of data source and data sink because audio and video data may be exchanged between the server and client. For discussion purposes, the description will use the configuration shown in FIG. 1A where server 102 is a source and client 104 is a sink and flow path 106 is the path of the data flow from the server to the client. It will be understood that the description applies when the roles of source and sink are reversed.

Server 102 and client 104 can be connected by network devices R1-R4. Server 102, for example, can be connected to endpoint network device R1. Network device R1 can be a router or a gateway device to give server 102 access to network 108. Likewise, client 104 can be connected to endpoint network device R4 which can be a router or a gateway device to give client 104 access to network 108. Network 108, in turn can comprise one or more intermediate network devices, such as network devices R2 and R3 shown in FIG. 1A. Network 108 can represent any data network such as local area network (LAN), a wide area network (WAN), etc.

A fixed flow path can be established for a data flow between server 102 and client 104, for example, in order to facilitate real-time communication between server and client. Any one of several approaches can be used. Merely as an example, Multiprotocol Label Switching (MPLS) based routing can be used to define a flow path between server 102 and client 104. Flow path 106 represents an example of a fixed flow path comprising network devices R2 and R3 between server 102 and client 104, where network devices R1 and R4 represent endpoints of the flow path and network devices R2 and R3 represent intermediate devices.

In accordance with embodiments of the present disclosure, endpoint network device R1 can be configured to reserve bandwidth for the flow path to ensure a given quality of service (QoS) for a specific flow path 106. Bandwidth is reserved in each network device along the flow path; this can be referred to as end-to-end bandwidth reservation. Bandwidth in a network device can be defined as the maximum amount of data transmitted by the network in a given amount of time. Bandwidth can be expressed as a data rate, for example, in units such a megabits per second (Mbps), gigabits per second (Gbps), etc. Bandwidth in a network device can be defined on a per data flow basis. Bandwidth reservation for a data flow means that a network device ensures packets for the data flow will be transmitted at a certain data rate. Reserving a certain bandwidth in each network device for a given flow path effectively sets the bandwidth for the flow path.

For discussion purposes, the Resource Reservation Protocol (RSVP) will be used as an illustrative mechanism for reserving bandwidth. RSVP can be used to specify bandwidth reservation in each network device R1 to R4 along data path 106. It will be understood that persons of ordinary skill should be able to adapt other bandwidth reservation techniques to operate in accordance with the present disclosure.

RSVP message processing is known. Briefly, RSVP can be used to establish end-to-end bandwidth reservation. A sender (e.g., network device R1) at one endpoint in the flow path (e.g., flow path 106) specifies a reserved bandwidth in a PATH message that is sent to a receiver (e.g., network device R4) at the other endpoint in the flow path. The PATH message passes through the intermediate network devices (e.g., R2, R3) that define the flow path. The receiver responds with a RESV message as a confirmation, which is sent back to the sender on the path comprising the intermediate network devices. Each network device that receives the RESV message can configure itself to reserve the bandwidth specified in the received RESV message. The sender determines the initial bandwidth to be reserved; subsequent increases or decreases in reserved bandwidth are also made by the sender using subsequent PATH messages. The sender (e.g., network device R1) can configure itself with the bandwidth reservation at the time it sends the PATH message, or in response to receiving the RESV message. The receiver (e.g., network device R4) can configure itself with the new bandwidth reservation in response to receiving the PATH message.

In accordance with the present disclosure, network device R1 can model the flow behavior of a given data flow and periodically compute a bandwidth reservation (e.g., 114) based on the flow model. Using RSVP, a computed bandwidth reservation can be incorporated in a PATH message to reserve bandwidth in network devices R1 to R4 according the computed bandwidth reservation. In accordance with some embodiments, network device R1 can receive bandwidth (BW) modeling parameters 112 to model the flow behavior in the network device. Bandwidth parameters 112 can be provided by a user (e.g., a network manager, not shown) or received from a controller (e.g., FIG. 1B). In some embodiments, for example, the model can be a statistical model and the bandwidth parameters can include information to build the statistical model. Adjusting or otherwise adapting bandwidth reservation of the network device based on a model of the data flow can provide more accurate allocation of bandwidth and reduce the risk of over- or under-subscribing bandwidth. These aspects of the present disclosure are described below.

As noted above, bandwidth reservations can be adjusted on a per data flow basis. FIG. 1A shows a single data flow on a single flow path, namely flow path 106. Although not shown in the figure, it will be understood that a network device can be on the flow path of several data flows. Likewise, a sender (e.g., R1) can participate in multiple data flows along separate flow paths. The remaining discussion of the present disclosure will be described in terms of one data flow along one flow path (e.g., flow path 106) with the understanding that the present disclosure can be applied to each flow path when the sender participates in multiple data flows on multiple flow paths.

Figure 1B:
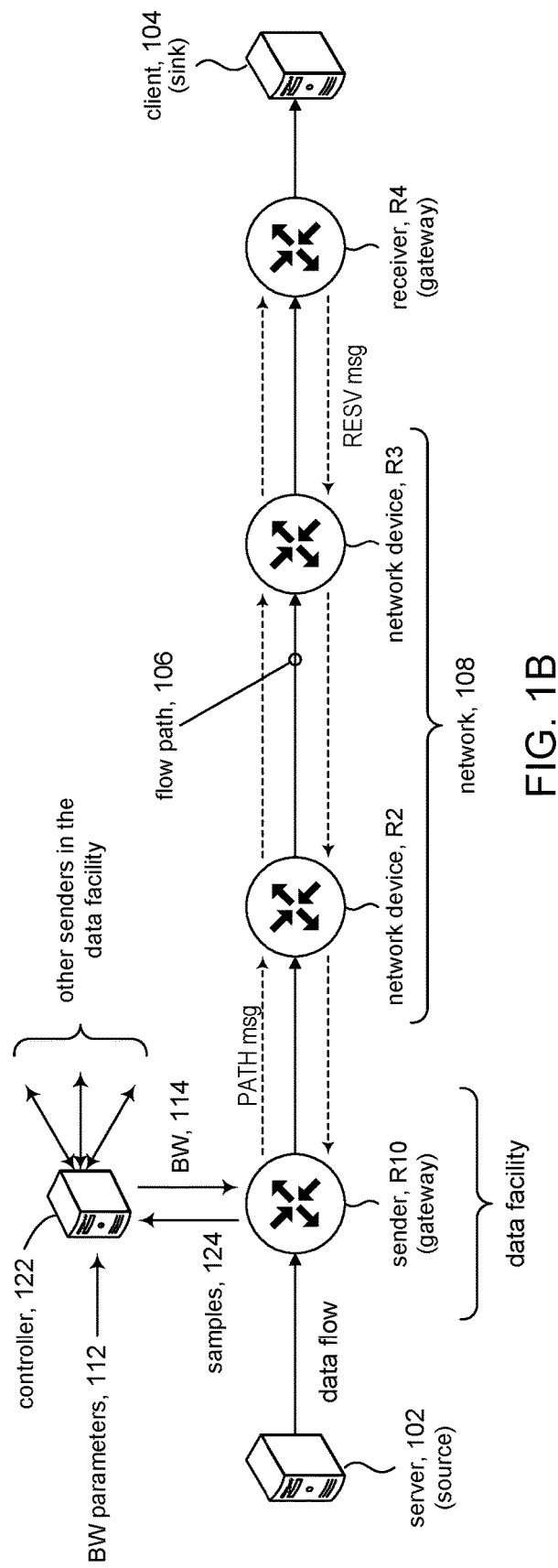
FIG. 1B shows a configuration in accordance with another embodiment of the present disclosure.

FIG. 1B shows a configuration for monitoring and adjusting bandwidth reservation in accordance with other embodiments of the present disclosure. The configuration in FIG. 1B is similar to the configuration shown in FIG. 1A, with the inclusion of controller 122. In some embodiments, sender network device R10 can be configured to sample its data flow rate. R10 can send the sampled data flow as a stream of data samples 124 to controller 122. Using modeling parameters 112 provided to controller 122, the controller can model the flow behavior in R10 based on the received data samples and compute a bandwidth reservation 114 that can be sent back to network device R10. Using RSVP, the network device can incorporate the received bandwidth reservation in a PATH message to configure network devices R10 to R4 according to the computed bandwidth reservation.

FIG. 1B further shows that in some embodiments, controller 122 can be deployed in a central data facility (e.g., a data center) to manage several senders (e.g., network device R10) in the data facility. Each sender can sample its data flow and provide the sampled data to controller 122. The controller can model each data flow using the respective sampled data. Controller 122 can generate respective bandwidth reservations based on each model and send the bandwidth reservations to the respective network devices. The network devices can perform bandwidth reservation adjustment (e.g., using RSVP) to support their respective data flows.

Figure 2:
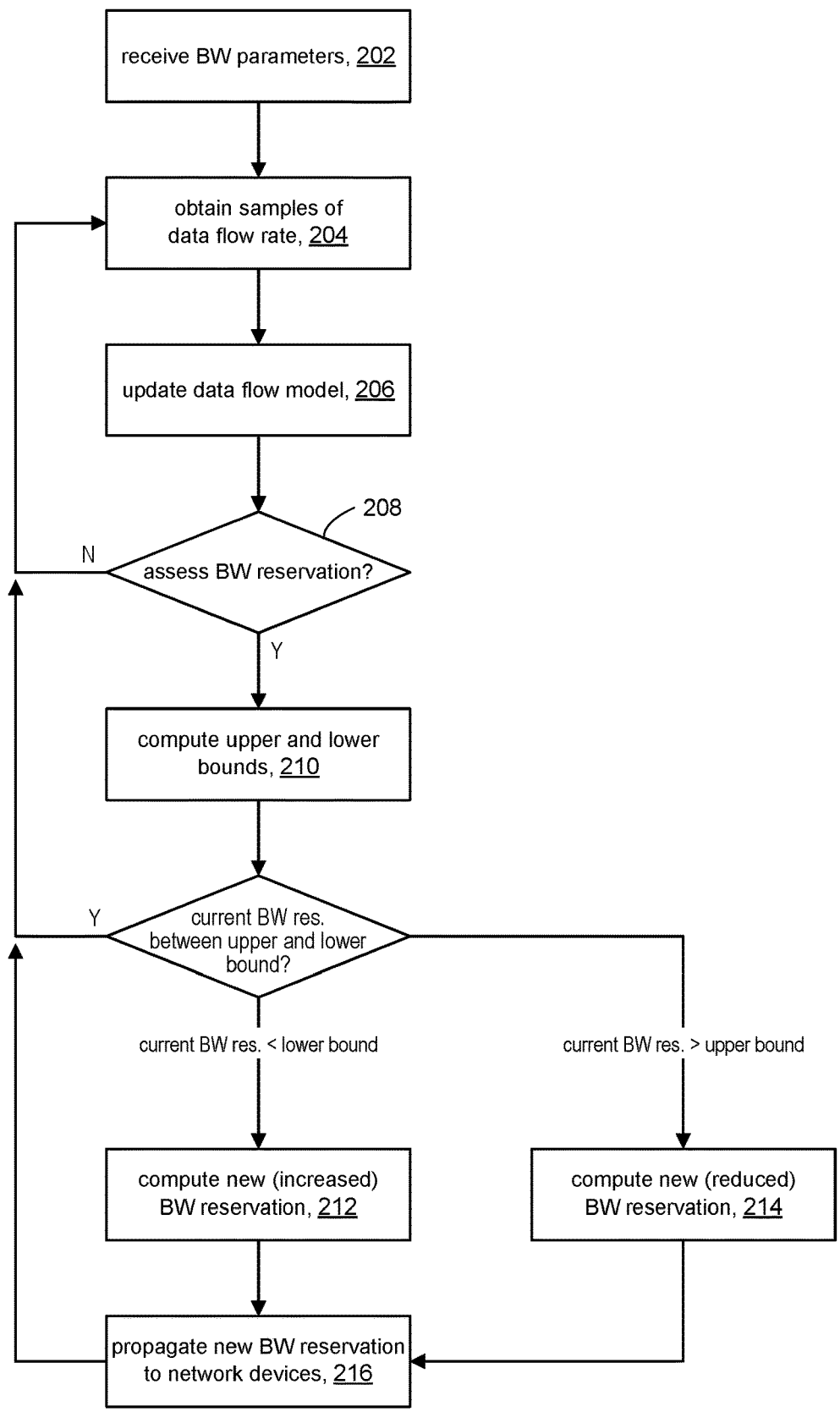
FIG. 2 shows processing in a network device in accordance with the present disclosure.

Referring to FIG. 2, the discussion will now turn to a high level description of processing in a network device (e.g., network device R1) for adjusting bandwidth reservation in accordance with the present disclosure. In some embodiments, for example, the network device can include computer executable program code, which when executed by a processor (e.g., CPU 408, FIG. 4), can cause the network device to perform the processing in accordance with FIG. 2. The flow of operations performed by the network device is not necessarily limited to the order of operations shown.

As noted above, bandwidth reservation can be managed on a per data flow basis. The following discussion will apply to a given data flow in the network device with the understanding that the operations can be applied on each data flow.

At operation 202, the network device can receive bandwidth modeling parameters (e.g., 112). In some embodiments, for example, the bandwidth parameters can be configured in the network device by a user such as a network manager. In other embodiments, the bandwidth parameters can be provided to the network device by a controller (e.g., 122). As explained below, the bandwidth parameters can be used to (1) model the data flow through the network device and (2) generate bandwidth reservation based on the modeled data flow. In some embodiments, for example, the bandwidth parameters include assessment period P, sampling period S, weighting factors $\alpha_h$, $\alpha_l$, and min/max bandwidth reservation values MINBANDWIDTH, MAXBANDWIDTH. These parameters are discussed below.

At operation 204, the network device can take or otherwise obtain samples of the given data flow through the network device. The given data flow can be identified based on the source and destination addresses, e.g., internet protocol (IP) addresses, of the ingress packets. In some embodiments, samples of the given data flow can be obtained by periodically sampling the data rate of the data flow. For instance, the sampling period S provided in the bandwidth parameters describe above can be used to set the sampling rate; e.g., one sample every S units of time. As for taking a sample, the network device can include hardware that counts the total amount of data transmitted for each data flow. This hardware counter can be read periodically. The network device can read a current value of the counter and subtract the previously read value of the counter to obtain the amount of data transmitted during the previous period. Dividing this difference by the sampling period S yields a sampled data rate, which can be expressed as a bit rate such as Mbps, Gbps, and the like.

At operation 206, the network device can update a model of the given data flow. It will be appreciated that any suitable model can be used to represent the given data flow. The model can then be used to predict or otherwise anticipate changes in the data flow's bandwidth. In some embodiments, the model can be based on the sampled data rate. For discussion purposes, a statistical model will be used to represent the given data flow. More particularly, because the sampled data rate comprises time-series data, the data flow can be modeled using a moving average statistic. In some embodiments, for example, the model can be based on the moving average statistic known as the exponential weighted moving average (EWMA). Details of the model that incorporates EWMA are discussed below. Briefly, however, the model includes an upper bound bandwidth reservation value and a lower bound bandwidth reservation value. The model is used to maintain the bandwidth reservation for the data flow between the upper bound and the lower bound.

At operation 208, the network device can determine whether or not to assess the current end-to-end bandwidth reservation setting. In accordance with the present disclosure, assessment of the current end-to-end bandwidth reservation does not necessarily result in adjusting the end-to-end bandwidth reservation; this aspect of the present disclosure is explained below. Bandwidth reservation can be assessed periodically, for example, based on the assessment period P contained in the bandwidth parameters obtained at operation 202. In some embodiments, the assessment period can be based on the passage of time; e.g., assess bandwidth reservation every 10 minutes, every 20 minutes, etc. In some embodiments, the assessment period can be performed after some predetermined number of samples of the data flow have been taken (operation 204); for example, assess bandwidth reservation every 100 data samples, every 200 data samples, etc. If it is not time to assess the current bandwidth reservation, then processing can return to operation 204 to continue sampling the data flow and updating the data flow model. If it is time to assess the current bandwidth reservation, then processing can proceed to operation 210.

At operation 210, the network device can compute a lower bound bandwidth reservation value (BW$_{LOWERBOUND}$) and an upper bound bandwidth reservation value (BW$_{UPPERBOUND}$) from the model. Details are described below. If the current bandwidth reservation setting falls between the lower and upper bounds, then the current bandwidth reservation setting does not need to be adjusted and processing can return to operation 204 to continue sampling the data flow and updating the data flow model. If the current bandwidth reservation setting falls below the lower bound, then processing can proceed to operation 212. If the current bandwidth reservation setting exceeds the upper bound, then processing can proceed to operation 214. Details of this aspect of the present disclosure are discussed below.

At operation 212, the network device can compute a new bandwidth reservation setting from the model. More specifically, because the current bandwidth reservation setting is less than the lower bound bandwidth reservation value, the network device can compute an increased bandwidth reservation setting in order to restore the bandwidth reservation setting between the lower and upper bounds. Processing can proceed to operation 216.

At operation 214, the network device can compute a new bandwidth reservation setting from the model. More specifically, because the current bandwidth reservation setting exceeds the upper bound bandwidth reservation value, the network device can compute a decreased bandwidth reservation setting in order to restore the bandwidth reservation setting between the lower and upper bounds. Processing can proceed to operation 216.

At operation 216, the network device can propagate the new bandwidth reservation setting to the network devices along the flow path. In some embodiments, the new end-to-end bandwidth reservation can be established in accordance with RSVP as described above. Processing can return to operation 204 to continue sampling the data flow and updating the data flow model.

The discussion will now turn to a description of details of the exponential weighted moving average model ("the model") introduced above in the description of FIG. 2. The general form of the model can be expressed in terms of the following model parameters:

$$\delta \leftarrow x - \mu$$

$$\mu \leftarrow \mu + \alpha \times \delta$$

$$\sigma^2 \leftarrow (1-\alpha) \times (\sigma^2 + \alpha \times \delta^2)$$

where,
x is a sampled data rate (bandwidth measurement),
μ is the exponential moving average of sampled data rates,
σ is an exponential moving standard deviation of the exponential moving average (the exponential moving variance is $\sigma^2$),
δ is a change in the sampled data rate relative to the moving average, and
α is a weighting factor that is applied to the most recent sampled data rate.

μ and σ can be initialized to zero. The weighting factor α can be used to emphasize or de-emphasize the importance of the most recently sampled data rate. A higher α discounts older observations faster.

In accordance with some embodiments, the model utilizes two moving averages based on the general form shown above to represent the data flow: a high-sensitivity moving average ($\mu_h$) and a low-sensitivity moving average ($\mu_l$). The high-sensitivity moving average can be expressed as:

$$\delta_h \leftarrow x - \mu_h$$

$$\mu_h \leftarrow \mu_h + \alpha_h \times \delta_h$$

$$\sigma_h^2 \leftarrow (1-\alpha_h) \times (\sigma_h^2 + \alpha_h \times \delta_h^2)$$

where,
x is a sampled data rate (bandwidth measurement),
$\mu_h$ is the high-sensitivity exponential moving average of sampled data rates,
$\sigma_h$ is an exponential moving standard deviation of the high-sensitivity exponential moving average,
$\delta_h$ is a change in the sampled data rate relative to the high-sensitivity moving average, and
$\alpha_h$ is a high-sensitivity weighting factor.

The low-sensitivity moving average can be expressed as:

$$\delta_l \leftarrow x - \mu_l$$

$$\mu_l \leftarrow \mu_l + \alpha_l \times \delta_l$$

$$\sigma_l^2 \leftarrow (1-\alpha_l) \times (\sigma_l^2 + \alpha_l \times \delta_l^2)$$

where,
x is a sampled data rate (bandwidth measurement),
$\mu_l$ is the low-sensitivity exponential moving average of sampled data rates,
$\sigma_l$ is an exponential moving standard deviation of the low-sensitivity exponential moving average,
$\delta_l$ is a change in the sampled data rate relative to the low-sensitivity moving average, and
$\alpha_l$ is a low-sensitivity weighting factor.

The network device can obtain the high- and low-sensitivity weighting factors $\alpha_h$, $\alpha_l$ via the bandwidth parameters (operation 202, FIG. 2). The weighting factors can be set so that one moving average is more sensitive to changes in the data rate than the other. For example, setting $\alpha_h > \alpha_l$ (e.g., $\alpha_h=0.5$, $\alpha_l=0.1$) will allow $\mu_h$ to vary more quickly (more sensitive) to changes in the sampled data rate than $\mu_l$.

The data rate can be sampled periodically in order to update the model parameters as data rate changes over time. As noted above, in some instances the sampling period can be 30 seconds but in general can be any suitable amount of time. In some embodiments, the sampling rate can remain constant. In other embodiments, the sampling rate can vary, for example, based on how much the data rate changes.

In some embodiments, adjusting bandwidth reservation along the flow path (end-to-end bandwidth reservation) occurs independently of data sampling. Reserving end-to-end bandwidth takes more time and processing resources to do than sampling the data rate. Whereas the data rate is sampled only at the endpoint network device (e.g., R1), reserving bandwidth end-to-end involves every network device along the flow path (e.g., R1-R4). Reserving bandwidth too frequently can disrupt the very data flow for which bandwidth is being reserved. Accordingly, adjusting bandwidth reservation occurs less frequently than does data sampling.

As noted above, the current bandwidth reservation setting can be assessed against the model to determine whether to adjust (increase or decrease) bandwidth reservation or not. In accordance with some embodiments, the high sensitivity moving average ($\mu_h$) can be used to determine when to increase bandwidth reservation in order to ensure sufficient bandwidth along the flow path when the model indicates an increase in the data flow. The low sensitivity moving average ($\mu_l$) can be used to determine when to decrease bandwidth reservation to reduce the risk of giving up bandwidth due to a sudden but transient drop in data flow, as for example, might happen during quiet periods in a video conference. When bandwidth is given up, it can be difficult to get it back later. Using a less sensitive moving average ensures a long enough delay to justify releasing unused bandwidth.

In some embodiments, the model can include the following lower and upper bandwidth reservation bounds:

$$BW_{LOWERBOUND} = \mu_h + 2 \times \sigma_h$$

$$BW_{UPPERBOUND} = \mu_l + 4 \times \sigma_l$$

Bandwidth reservation can be maintained between the upper and lower bounds by adjusting the end-to-end bandwidth reservation when the current bandwidth reservation setting falls outside of the bounds (operation 210). In some embodiments, for example, the current bandwidth reservation can be set according to the following pseudo-code:

```
if currentBw < μ_h + 2×σ_h:  // BWLOWERBOUND
    currentBw = max( min( μ_h + 3×σ_h, MAXBANDWIDTH ), MINBANDWIDTH )
    // set the new end-to-end bandwidth reservation
    setBandwidth( currentBw )
else if currentBw > μ_l + 4×σ_l:  // BWUPPERBOUND
    currentBw = max( min( μ_l + 2×σ_l, MAXBANDWIDTH ), MINBANDWIDTH )
    // set the new end-to-end bandwidth reservation
    setBandwidth( currentBw )
``` where,
  currentBw is the current bandwidth reservation setting, and
  MINBANDWIDTH and MAXBANDWIDTH set minimum and maximum allowable bandwidth settings for any given data flow.

In some embodiments, the data flow model can be based on one average ($\mu$) and one variance ($\sigma$), rather than distinguishing between high- and low-sensitivity statistics ($\mu_h$, $\sigma_h$, $\mu_l$, $\sigma_l$). Accordingly, the foregoing computations can be expressed only in terms of $\mu$ and $\sigma$.

Figure 3:
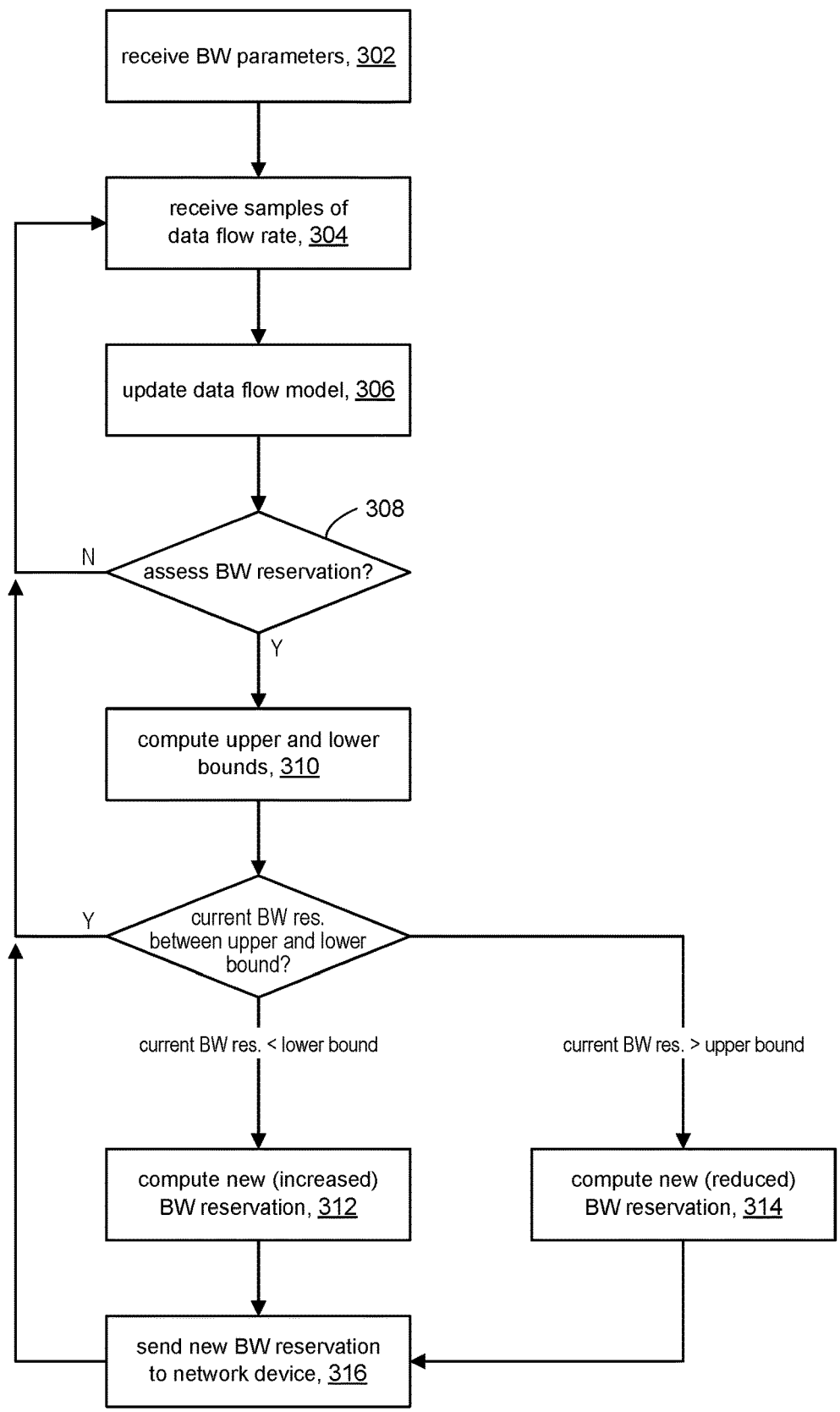
FIG. 3 shows processing in a controller in accordance with the present disclosure.

Referring to FIG. 3, the discussion will now turn to a high level description of processing in a controller (e.g., controller 122) for adjusting bandwidth reservation in accordance with the present disclosure. Rather than a network device (e.g., R1) determining when to adjust bandwidth reservation, in some embodiments the controller can perform those operations. In some embodiments, for example, the controller can include computer executable program code, which when executed by a processor (e.g., 502, FIG. 5), can cause the controller to perform the processing in accordance with FIG. 3. The flow of operations performed by the controller is not necessarily limited to the order of operations shown.

As noted above, the controller can manage bandwidth reservations among a deployment of network devices, for example, in a data center. The following description of operations in the controller apply to interactions with one such network device (the given network device) in the deployment, with the understanding that the described operations can apply to other network devices in the deployment. Reference can be made to corresponding or otherwise similar operations in FIG. 2 for additional details.

At operation 302, the controller can receive bandwidth modeling parameters, for example, from a network manager. In some embodiments, the received bandwidth modeling parameters can be used to model the data flow in each network device that is managed by the controller. In other embodiments, individual bandwidth parameters can be provided for each network device in the deployment so that the data flow in each network device can be modeled differently from the other network devices.

At operation 304, the controller can receive samples of the data flow rate from the given network device.

At operation 306, the controller can update a model of the given data flow associated with the given network device. It is noted that each network device that is managed by the controller will have its own corresponding data flow model based on the samples provided by that network device. The controller can provide and allocate more processing and memory resources than may be possible in a network device so that more sophisticated models can be employed to improve predictability. In some embodiments, for example, the model described above, which is based on mean and variance, can be extended to use multi-variate statistical regression based on n recent samples to predict currently used bandwidth boundaries. In some embodiments, the modeling can be further extended to use a multi-layer perceptron/neural network to model the same, and so on.

At operation 308, the controller can determine whether or not to assess the current end-to-end bandwidth reservation setting associated with the given network device.

At operation 310, the controller can compute the upper bound bandwidth reservation value and the lower bound bandwidth reservation value from the model, for the given network device. If the current bandwidth reservation setting falls between the upper and lower bounds, then the current bandwidth reservation setting does not need to be adjusted and processing can return to operation 304 to continue receiving data samples from the given network device. If the current bandwidth reservation setting falls below the lower bound, then processing can proceed to operation 312. If the current bandwidth reservation setting exceeds the upper bound, then processing can proceed to operation 314.

At operations 312 and 314, the controller can compute a new bandwidth reservation setting from the model, for the given network device. Processing can proceed to operation 316.

At operation 316, the controller can send the newly computed bandwidth reservation setting to the given network device, whereupon the given network device can propagate the new bandwidth reservation setting to the network devices along the flow path. In some embodiments, the new end-to-end bandwidth reservation can be established in accordance with RSVP as described above. Processing can return to operation 304 to continue receiving data samples from the given network device.

Figure 4:
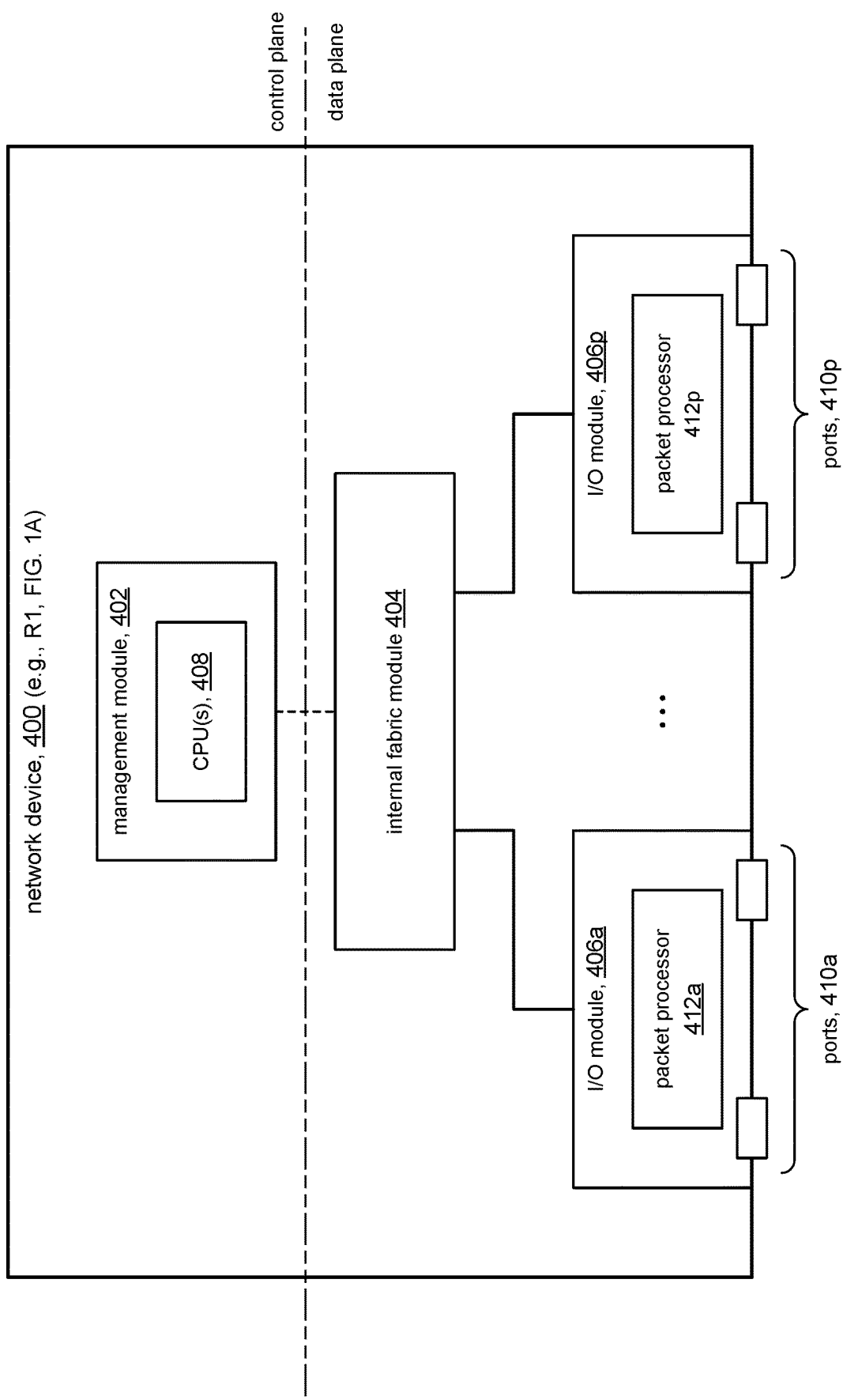
FIG. 4 sows an illustrative network device in accordance with the present disclosure.

FIG. 4 depicts an example of a network device 400 (e.g., R1, FIG. 1A) in accordance with some embodiments of the present disclosure. As shown, network device 400 includes a management module 402, an internal fabric module 404, and a number of I/O modules 406a-406p. Management module 402 includes the control plane (also referred to as control layer) of network device 400 and can include one or more management CPUs 408 for managing and controlling operation of network device 400 in accordance with the present disclosure (e.g., FIG. 2). Each management CPU 408 can be a general purpose processor, such as an Intel®/AMD® x86 or ARM® processor, that operates under the control of software stored in a memory (not shown), such as dynamic random access memory (DRAM). Control plane refers to all the functions and processes that determine which path to use, such a routing protocols, spanning tree, and the like.

Internal fabric module 404 and I/O modules 406a-406p collectively represent the data plane of network device 400 (also referred to as data layer, forwarding plane, etc.). Internal fabric module 404 is configured to interconnect the various other modules of network device 400. Each I/O module 406a-406p includes one or more input/output ports 410a-410p that are used by network device 400 to send and receive network packets. Each I/O module 406a-406p can also include a packet processor 412a-412p. Each packet processor 412a-412p can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane.

Figure 5:
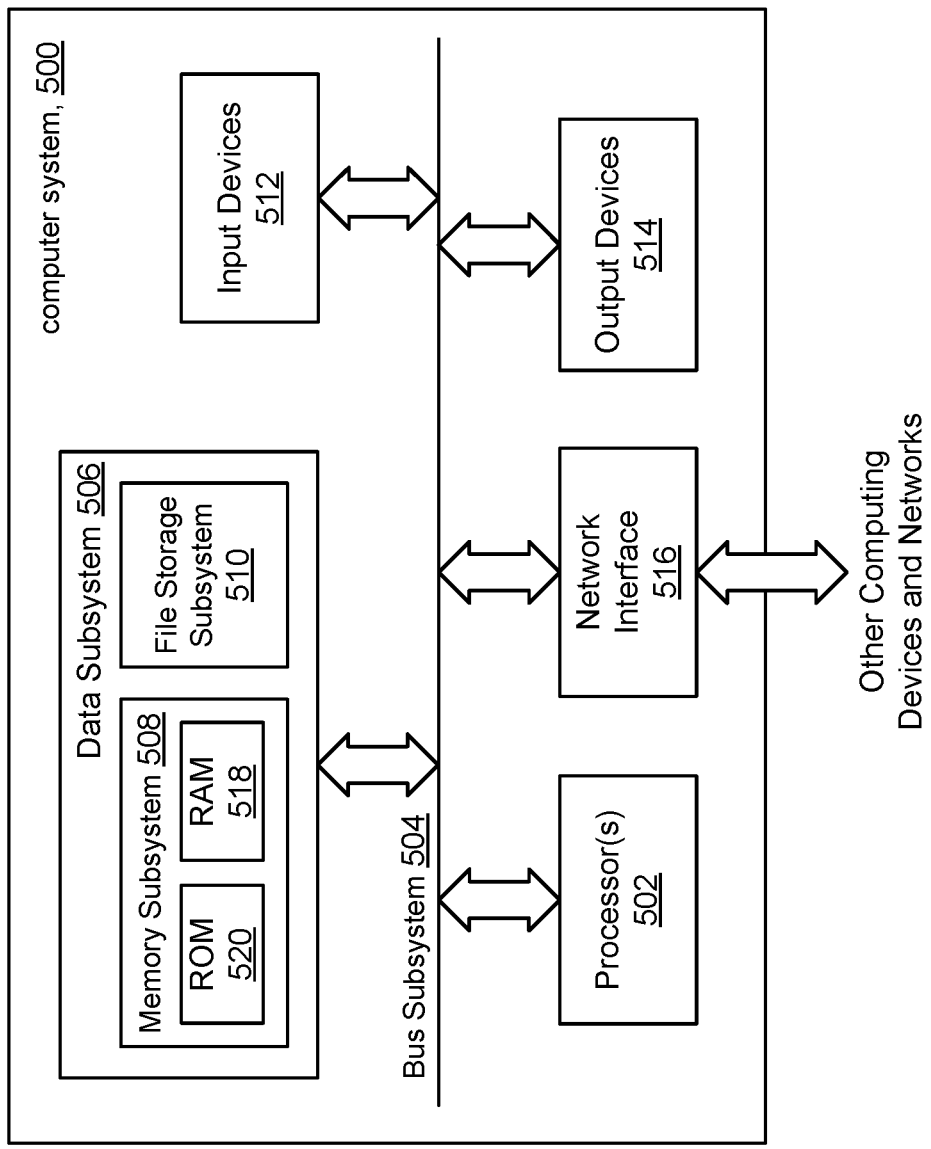
FIG. 5. shows an illustrative controller in accordance with the present disclosure.

FIG. 5 depicts a simplified block diagram of an example computer system 500 according to certain embodiments. Computer system 500 can be used to implement controller 122 (FIG. 1B) described in the present disclosure. As shown in FIG. 5, computer system 500 includes one or more processors 502 that communicate with a number of peripheral devices via bus subsystem 504. These peripheral devices include data subsystem 506 (comprising memory subsystem 508 and file storage subsystem 510), user interface input devices 512, user interface output devices 514, and network interface subsystem 516.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple busses.

Network interface subsystem 516 can serve as an interface for communicating data between computer system 500 and other computer systems (e.g., network device R10, FIG. 1B). Embodiments of network interface subsystem 516 can include, e.g., an Ethernet card, a Wi-Fi adapter, and/or the like.

User interface input devices 512 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 500.

User interface output devices 514 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 500.

Data subsystem 506 includes memory subsystem 508 and file/disk storage subsystem 510 represent non-transitory computer-readable storage media that can store program code and/or data, which when executed by processor 502, can cause processor 502 to perform operations in accordance with embodiments of the present disclosure (e.g., FIG. 3).

Memory subsystem 508 includes a number of memories including main random access memory (RAM) 518 for storage of instructions and data during program execution and read-only memory (ROM) 520 in which fixed instructions are stored. File storage subsystem 510 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 500 is illustrative and many other configurations having more or fewer components than system 500 are possible.

Further Examples

In accordance with the present disclosure, a method can include obtaining a data rate sample of a data flow through a network device; updating a first set of data flow parameters with the data rate sample; updating a second set of data flow parameters with the data rate sample; computing a lower bound value using the first set of data flow parameters; computing an upper bound value using the second set of data flow parameters; adjusting a bandwidth reservation of the network device to a setting between the lower bound value and the upper bound value; and repeating the foregoing actions to maintain sufficient bandwidth for the data flow as the data rate of the data flow changes over time.

In some embodiments, the method can further include adjusting a bandwidth reservation of intermediate network devices along a path of the data flow, between the network device and an endpoint network device, to a setting between the lower bound value and the upper bound value.

In some embodiments, the method can further include adjusting the bandwidth reservation of the network device when a current setting of the bandwidth reservation is less than the lower bound value, including computing a new setting of the bandwidth reservation using the first set of data flow parameters and adjusting the bandwidth reservation of the network device to the new setting.

In some embodiments, the method can further include adjusting the bandwidth reservation of the network device when a current setting of the bandwidth reservation is greater than the upper bound value, including computing a new setting of the bandwidth reservation using the second set of data flow parameters and adjusting the bandwidth reservation of the network device to the new setting.

In some embodiments, the first set of data flow parameters comprises a first weighted average data flow rate ($\mu 1$) and a first standard deviation value ($\sigma 1$), wherein the second set of data flow parameters comprises a second weighted average data flow rate ($\mu 2$) and a second standard deviation value ($\sigma 2$). In some embodiments, updating the first and second set of data flow parameters includes computing updated values for ($\mu 1$, $\sigma 1$) and ($\mu 2$, $\sigma 2$), respectively, using first and second respective weighting factors. In some embodiments, adjusting the bandwidth includes computing a new setting of the bandwidth reservation for the data flow using ($\mu 1$, $\sigma 1$) when a current setting of the bandwidth reservation is less than the lower bound value and using ($\mu 2$, $\sigma 2$) when the current setting of the bandwidth reservation is greater than the upper bound value.

In some embodiments, the method is performed in the network device.

In some embodiments, the method can further include receiving parameters that specify a sampling rate for sampling the data rate and an adjustment rate for adjusting the bandwidth reservation of the network device.

In accordance with the present disclosure, a method can include obtaining sampled data rates of a data flow through a network device; updating at least one average value using the sampled data rates; repeatedly updating a lower bandwidth reservation limit for the network device by computing an updated value for the lower bandwidth reservation limit based on the at least one average value; repeatedly updating an upper bandwidth reservation limit for the network device by computing an updated value for the upper bandwidth reservation limit based on the at least one average value; and maintaining a bandwidth reservation in the network device between the lower and upper bandwidth reservation limits by adjusting a current setting of the bandwidth reservation when the current setting of the bandwidth reservation falls outside a range bounded by the lower bandwidth reservation limit and the upper bandwidth reservation limit.

In some embodiments, the method can further include receiving a parameter that indicates a sampling rate; and sampling the data rate of the data flow at the sampling rate.

In some embodiments, the method can further include receiving a parameter that indicates an adjustment rate; and adjusting the current setting of the bandwidth reservation at the adjustment rate.

In some embodiments, maintaining a bandwidth reservation in the network device between the lower and upper bandwidth reservation limits includes computing a new bandwidth reservation value and setting the bandwidth reservation in the network device according to the new bandwidth reservation value. In some embodiments, the method can further include setting bandwidth reservation in a plurality of network devices on a flow path of the data flow according to the new bandwidth reservation value.

In some embodiments, obtaining the sampled data rates includes receiving the sampled data rates from the network device, wherein adjusting the current setting of the bandwidth reservation includes computing a new bandwidth reservation value and transmitting the new bandwidth reservation value to the network device, wherein the network device sets bandwidth reservation in a plurality of network devices on a flow path of the data flow according to the new bandwidth reservation value.

In some embodiments, the method can further include updating a first average value using the sampled data rate; and updating a second average value using the sampled data rate, wherein the lower bandwidth reservation limit is based on the first average value, wherein the upper bandwidth reservation limit is based on the second average value.

In accordance with the present disclosure, a network device can include one or more computer processors; and a computer-readable storage medium comprising instructions for controlling the one or more computer processors to: sample data rates of a data flow through the network device; updating lower and upper bandwidth reservation limits for the network device based on the sampled data rates; and adjusting a bandwidth reservation of the network device when a current setting of the bandwidth reservation falls outside a range bounded by the lower and upper bandwidth reservation limits, including computing a new bandwidth reservation setting based on the sampled data rates and setting a bandwidth reservation in each network device on a flow path associated with the data flow according to the new bandwidth reservation.

In some embodiments, the computer-readable storage medium further comprises instructions for controlling the one or more computer processors to compute one or more average values from the sampled data rates, wherein the lower and upper bandwidth reservation limits are based on the one or more average values, wherein the new bandwidth reservation is computed based on the one or more average values.

In some embodiments, the computer-readable storage medium further comprises instructions for controlling the one or more computer processors to receive a parameter that indicates how frequently to sample the data rate.

In some embodiments, the computer-readable storage medium further comprises instructions for controlling the one or more computer processors to receive a parameter that indicates how frequently to assess the current bandwidth reservation setting against the range bounded by the lower and upper bandwidth reservation limits.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method comprising:
obtaining a data rate sample of a data flow through a network device;
updating a first set of data flow parameters with the data rate sample;
updating a second set of data flow parameters with the data rate sample;
computing a lower bound value using the first set of data flow parameters;
computing an upper bound value using the second set of data flow parameters;
ensuring the data rate of the data flow is between the lower bound value and the upper bound value by adjusting a bandwidth reservation of the network device to a setting between the lower bound value and the upper bound value in response to a current setting of the bandwidth reservation of the network device being outside a range of the lower bound value and the upper bound value; and
repeating the foregoing actions to maintain sufficient bandwidth for the data flow as the data rate of the data flow changes over time.

2. The method of claim 1, further comprising adjusting a bandwidth reservation of intermediate network devices along a path of the data flow, between the network device and an endpoint network device, to a setting between the lower bound value and the upper bound value.

3. The method of claim 1, further comprising adjusting the bandwidth reservation of the network device when the current setting of the bandwidth reservation is less than the lower bound value, including computing a new setting of the bandwidth reservation using the first set of data flow parameters and adjusting the bandwidth reservation of the network device to the new setting.

4. The method of claim 1, further comprising adjusting the bandwidth reservation of the network device when the current setting of the bandwidth reservation is greater than the upper bound value, including computing a new setting of the bandwidth reservation using the second set of data flow parameters and adjusting the bandwidth reservation of the network device to the new setting.

5. The method of claim 1, wherein the first set of data flow parameters comprises a first weighted average data flow rate ($\mu_1$) and a first standard deviation value ($\sigma_1$), wherein the second set of data flow parameters comprises a second weighted average data flow rate ($\mu_2$) and a second standard deviation value ($\sigma_2$).

6. The method of claim 5, wherein updating the first and second set of data flow parameters includes computing updated values for ($\mu_1$, $\sigma_1$) and ($\mu_2$, $\sigma_2$), respectively, using first and second respective weighting factors.

7. The method of claim 5, wherein adjusting the bandwidth reservation includes computing a new setting of the bandwidth reservation for the data flow using ($\mu_1$, $\sigma_1$) when a current setting of the bandwidth reservation is less than the lower bound value and using ($\mu_2$, $\sigma_2$) when the current setting of the bandwidth reservation is greater than the upper bound value.

8. The method of claim 1, wherein the method is performed in the network device.

9. The method of claim 1, further comprising receiving parameters that specify a sampling rate for sampling the data rate and an adjustment rate for adjusting the bandwidth reservation of the network device.

10. A method comprising:
obtaining sampled data rates of a data flow through a network device;
updating at least one average value using the sampled data rates;
repeatedly updating a lower bandwidth reservation limit for the network device by computing an updated value for the lower bandwidth reservation limit based on the at least one average value;
repeatedly updating an upper bandwidth reservation limit for the network device by computing an updated value for the upper bandwidth reservation limit based on the at least one average value; and
ensuring the data rate of the data flow is between the lower bound value and the upper bound value including maintaining a bandwidth reservation in the network device between the lower and upper bandwidth reservation limits by adjusting a current setting of the bandwidth reservation when the current setting of the bandwidth reservation falls outside a range bounded by the lower bandwidth reservation limit and the upper bandwidth reservation limit.

11. The method of claim 10, further comprising: receiving a parameter that indicates a sampling rate; and sampling the data rate of the data flow at the sampling rate.

12. The method of claim 10, further comprising: receiving a parameter that indicates an adjustment rate; and adjusting the current setting of the bandwidth reservation at the adjustment rate.

13. The method of claim 10, wherein maintaining a bandwidth reservation in the network device between the lower and upper bandwidth reservation limits includes computing a new bandwidth reservation value and setting the bandwidth reservation in the network device according to the new bandwidth reservation value.

14. The method of claim 13, further comprising setting bandwidth reservation in a plurality of network devices on a flow path of the data flow according to the new bandwidth reservation value.

15. The method of claim 10, wherein obtaining the sampled data rates includes receiving the sampled data rates from the network device, wherein adjusting the current setting of the bandwidth reservation includes computing a new bandwidth reservation value and transmitting the new bandwidth reservation value to the network device, wherein the network device sets bandwidth reservation in a plurality of network devices on a flow path of the data flow according to the new bandwidth reservation value.

16. The method of claim 10, further comprising:
updating a first average value using the sampled data rate; and
updating a second average value using the sampled data rate,
wherein the lower bandwidth reservation limit is based on the first average value,
wherein the upper bandwidth reservation limit is based on the second average value.

17. A network device comprising:
one or more computer processors; and
a computer-readable storage medium comprising instructions for controlling the one or more computer processors to:
sample data rates of a data flow through the network device;
updating lower and upper bandwidth reservation limits for the network device based on the sampled data rates; and ensuring the data rate of the data flow is between the lower bound value and the upper bound value by adjusting a bandwidth reservation of the network device when a current setting of the bandwidth reservation falls outside a range bounded by the lower and upper bandwidth reservation limits, including computing a new bandwidth reservation setting based on the sampled data rates and setting a bandwidth reservation in each network device on a flow path associated with the data flow according to the new bandwidth reservation.

18. The network device of claim 17, wherein the computer-readable storage medium further comprises instructions for controlling the one or more computer processors to compute one or more average values from the sampled data rates, wherein the lower and upper bandwidth reservation limits are based on the one or more average values, wherein the new bandwidth reservation is computed based on the one or more average values.

19. The network device of claim 17, wherein the computer-readable storage medium further comprises instructions for controlling the one or more computer processors to receive a parameter that indicates how frequently to sample the data rate.

20. The network device of claim 17, wherein the computer-readable storage medium further comprises instructions for controlling the one or more computer processors to receive a parameter that indicates how frequently to assess the current bandwidth reservation setting against the range bounded by the lower and upper bandwidth reservation limits.

* * * * *